United States Patent [19]

Alford et al.

[11] Patent Number: 5,329,620
[45] Date of Patent: Jul. 12, 1994

[54] DAISY CHAINABLE VOICE-DATA TERMINAL

[75] Inventors: Gary D. Alford, Campbell; Robert E. Sellers, Santa Clara, both of Calif.

[73] Assignee: One Touch Systems, Inc., Santa Clara, Calif.

[21] Appl. No.: 858,318

[22] Filed: Mar. 25, 1992

[51] Int. Cl.$^5$ .............................................. G06F 13/00
[52] U.S. Cl. ..................................... 395/200; 395/275
[58] Field of Search .................................. 395/200, 275

[56] References Cited

U.S. PATENT DOCUMENTS 4,903,200  2/1990  Mook ................................. 364/405

Primary Examiner—Robert L. Richardson
Attorney, Agent, or Firm—Thomas E. Schatzel

[57] ABSTRACT

A daisy chain voice-data terminal for communicating data and voice signals between remote locations, comprising, according to an embodiment of the present invention, a microcomputer with a RAM for main memory and an EPROM for program memory, a membrane keypad connected to an input port of the microcomputer, a liquid crystal display adjacent to the keypad and connected to an output port of the microcomputer, a microphone and preamplifier, a differential output audio amplifier, a relay controlled by the microcomputer to switch the differential output audio amplifier on and off a daisy chain cable connected to other response keypads and a site controller, an RS-485 serial input/output to interface the microcomputer to the daisy chain cable, a switching regulator to provide five volts to the logic circuits, and a separate three-terminal linear regulator to supply five volts to the audio circuits. At each response keypad, the wiring for the audio channel is cross connected to balance out any noise that may be otherwise induced in the audio signal.

3 Claims, 2 Drawing Sheets

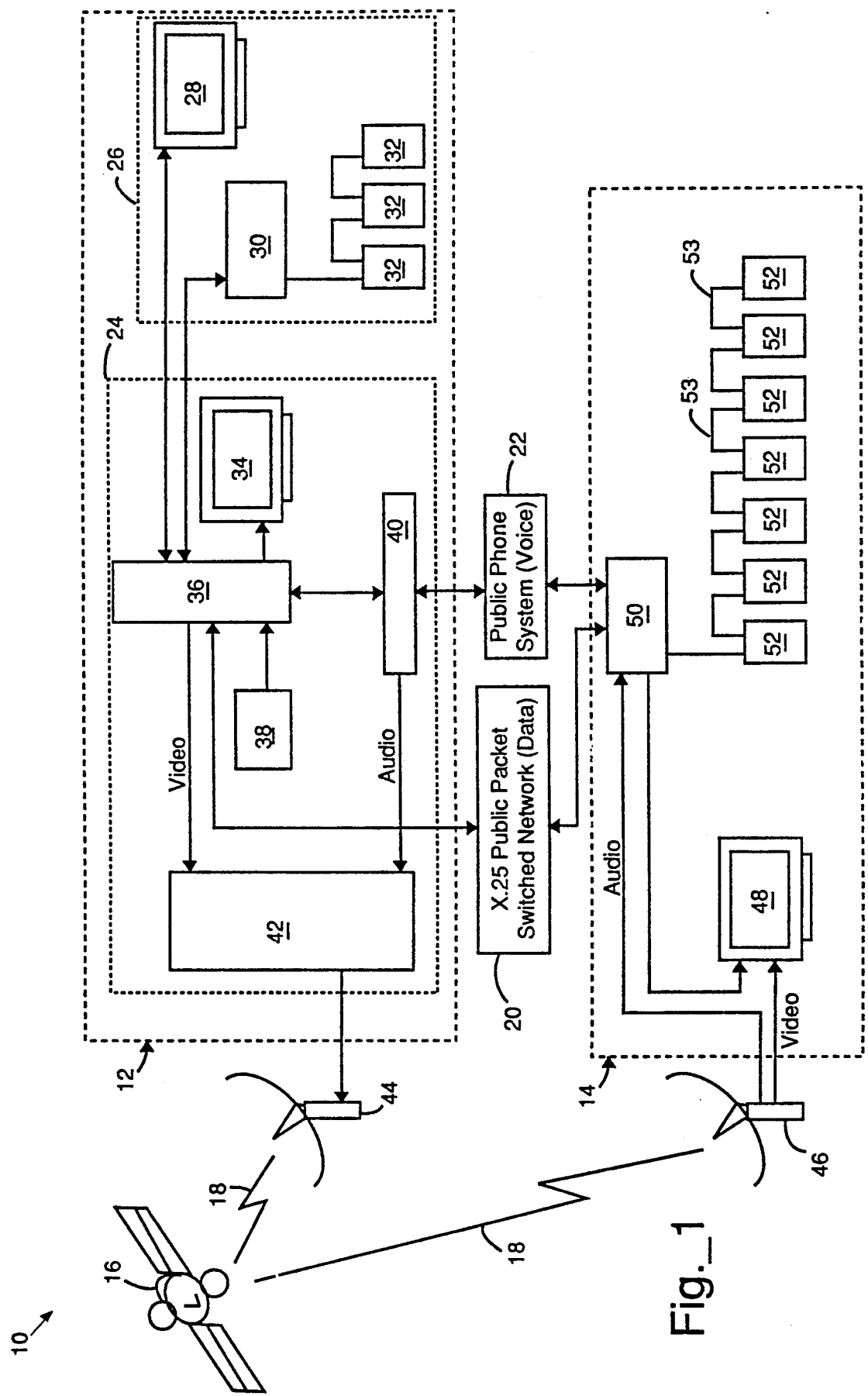
Fig._1

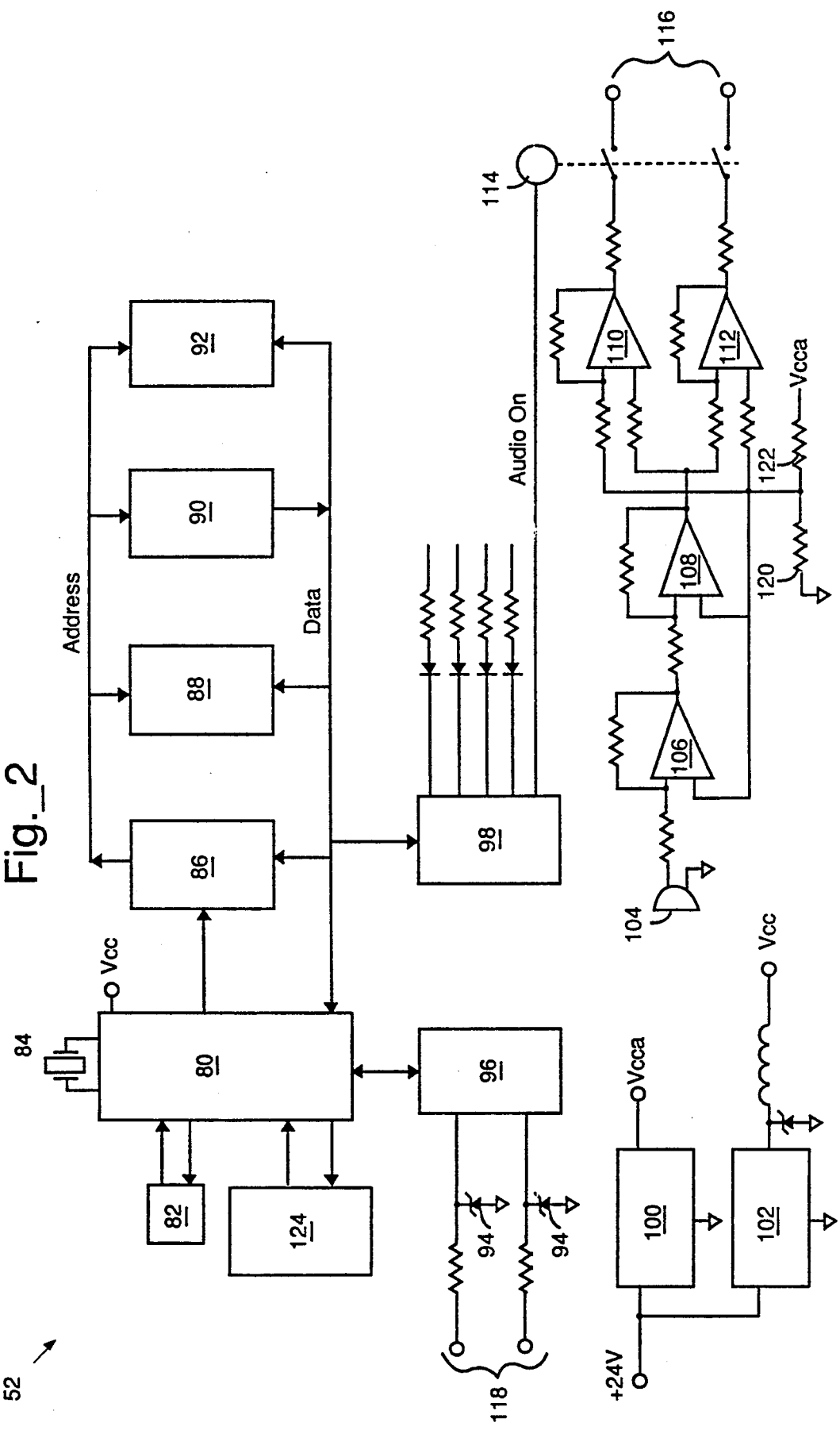
Fig._2

DAISY CHAINABLE VOICE-DATA TERMINAL

CROSS-REFERENCE TO RELATED APPLICATIONS

SITE CONTROLLER WITH ECHO SUPPRESSION, Ser. No. 07/858,319, filed Mar. 25, 1992, inventors Gary D. ALFORD and Robert E. SELLERS, assigned to assignee of the present invention; and COMPUTER IMPLEMENTED METHOD AND APPARATUS FOR REMOTE EDUCATIONAL INSTRUCTION, Ser. No. 07/858,321, filed Mar. 25, 1992, inventors Howard Stephen LEWIS, et al., assigned to assignee of the present invention.

BACKGROUND OF THE INVENTION

1. Field of the Invention

The invention relates generally to computer systems and specifically to a voice-data terminal including user units with digital logic and microphone pickups strung in a daisy chain of identical units all of which couple to a single controller.

2. Description of the Prior Art

Technology, in its various forms, has allowed the instructional classroom to be extended beyond the traditional campus to remote student locations by telecommunications. Community colleges have been offering telecourses for academic credit nationwide for at least the last ten years. Students in their homes may tune into tape recorded video series that are broadcast by PBS TV stations at regular times. Then, two or three times a semester, the telecourse students may meet on campus to take mid-term and final examinations. Usually a regular instructor has responsibility for conducting the tests and helping enrolled students during the progress of each telecourse. Currently, lower division undergraduate credit can be earned in this way in oceanography, geology, mathematics, business, and marketing, to name a few. Successful students learning with this form of instruction do so in spite of a lack of close contact with an instructor and sacrifice the ability to ask questions during lectures. One advantage is that telecourses are relatively inexpensive for all those involved because the local community college merely synchronizes itself with the schedule decided by a local PBS TV station that typically serves a region comprising several community college districts. The television station bears the expense of studio and transmitter equipment and the software when a video tape is provided in a syndication. The students need only to tune in a television receiver he or she may already own.

Businesses very often find it easier to cover the cost of more exotic teleconferencing and teleinstruction to conduct conferences and instructional sessions. Teleconferencing permits two-way picture and sound communications with the participants, but is much more expensive than ordinary telephone conferencing since special purpose video equipment and a video grade channel are needed to interconnect the parties. Teleinstruction allows a special interest class to be convened and communicated across town or across country on a secure channel if needed. Large, international companies use teleinstruction to train their sales forces that are physically located at various cities throughout the world. Traditional teleinstruction has not permitted individual students to communicate in real-time with the instructor, except as a member of a single site with a common audio channel.

There is a need for a system for remote distance education that permits an instructor to be informed of which students at remote sites wish to speak and to enable students desiring to speak to the instructor to have an individual audio channel communicating back to the instructor's studio facility.

SUMMARY OF THE PRESENT INVENTION

It is therefore an object of the present invention to provide a convenient and efficient way to provide a individual response keypad unit that permits both a student's data and voice to be communicated back to an instructor's studio facility.

It is a further object of the present invention to allow a number of response keypad units to be interconnected in a simple daisy chain that provides power, audio and computer communications in one cable.

It is a still further object of the present invention to provide a high quality, relatively noise-free audio channel from each of a string of student response keypads connected to a single site controller.

Briefly, a response keypad, according to an embodiment of the present invention, comprises a microcomputer with a RAM for main memory and an EPROM for program memory, a membrane keypad connected to an input port of the microcomputer, a liquid crystal display adjacent to the keypad and connected to an output port of the microcomputer, a microphone and preamplifier, a differential output audio amplifier, a relay controlled by the microcomputer to switch the differential output audio amplifier on and off a daisy chain cable connected to other response keypads and a site controller, an RS-485 serial input/output to interface the microcomputer to the daisy chain cable, a switching regulator to provide five volts to the logic circuits, and a separate three-terminal linear regulator to supply five volts to the audio circuits. At each response keypad, the wiring for the audio channel is cross connected to balance out any noise that may be otherwise induced in the audio signal.

An advantage of the present invention is that each student in a remote instruction environment is provided with a means for individual voice response to the instructor.

Another advantage of the present invention is that the audio channels from each student response keypad are relatively free from noise.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a remote instruction system having a studio site for an instructor and a remote site for a number of students which are interconnected by a satellite video channel and an audio channel through the public phone network; and FIG. 2 is a simplified schematic diagram of a response keypad unit for the remote site of the system of FIG. 1.

DETAILED DESCRIPTION OF THE PREFERRED EMBODIMENTS

In FIG. 1, a remote instruction system 10 comprises a host site 12 and at least one remote site 14. A satellite 16 establishes a first communication channel 18 between sites 12 and 14. A second communications channel 20 includes the X.25 public packet switched network for data A third communications channel 22 includes the public phone system direct distance dialed (DDD) network for voice communications. Host site 12 is a broadcast studio having a production control room 24 and a studio 26 for an instructor and comprises a touch monitor 28, a site controller 30, a plurality of response keypads 32, a host computer monitor 34, a host computer 36, an uninterruptable power supply (UPS) 38, a phone controller 40, a broadcast equipment unit 42, and a satellite communications uplink 44. Remote site 14 is a classroom comprising a satellite communications downlink 46, a television monitor 48, a site controller 50, and a plurality of response keypads 52 on a daisy chain cable 53. Site controllers 30 and 50 are similar, as are response keypads 32 and 52. A video image of the instructor is sent from host site 12 to each remote site 14 via communications channel 18. Data between the instructor and a plurality of students individually associated with a response keypad 52 are exchanged via communications channel 20. The voice of a selected student is communicated to the instructor via communications channel 22. A student wishing to speak to the instructor presses a button for this purpose on a respective response keypad 52. The instructor selects which, if any, student he or she wishes to enable to speak by touching an appropriate icon displayed by touch monitor 28. Host computer 36 reads the selection at touch monitor 28 and sends an enabling signal to site controller 50 via communications channel 20. A microphone within the corresponding response keypad 52 is connected through to cable 53 and a voice channel is opened up back to the instructor via communications channel 22. Site controller 50 dials an appropriate phone number to enable the connection of host site 12 to communications channel 22.

FIG. 2 illustrates an exemplary construction of response keypads 52. Response keypad 32 is preferably the same as response keypad 52, which comprises an Intel Corporation (Santa Clara, Calif.) type 8031 microcomputer 80, a clock 82, an 11.059 MHz crystal 84, an address latch 86, a erasable programmable read only memory (EPROM) 88, a random access memory (RAM) 90, a liquid crystal display (LCD) 92, a pair of input protection Zener diodes 94, a serial input/output (SIO) driver chip 96, an octal latch 98, a five volt three-terminal regulator 100, a switching regulator 102, an electret microphone 104, a pair of single-ended amplifiers 106 and 108, a pair of amplifiers 110 and 112 in a differential output drive configuration, and a relay 114. Audio output is switched onto a daisy chain terminals 116.

Site controller 50 sends serial I/O through a daisy chain connection 118. The selection of which student is enabled to speak to the instructor is carried down daisy chain connection 118 from site controller 50 and interpreted by microcomputer 80. A digital output signal from microcomputer 80 is latched by latch 98 and energizes relay 114. The voice of the selected student is picked up by microphone 104 and amplified by amplifiers 106, 108, 110 and 112 and output at daisy chain terminals 116 as a differential output signal. The base line voltage of the differential output signal is set above ground by a voltage divider comprising a pair of resistors 120 and 122. A membrane-type matrix keypad 124 is directly connected to a digital input port on microcomputer 80. If an enabled response keypad 52 is not the first in the daisy chain 53, then at each response keypad 52, daisy chain terminals 116 will cross connect the two wires within a shielded pair of wires used to link daisy chain connections 116 in daisy chain cable 53. This swapping of the wires in the shielded pair reduces induced electrical noise, especially any digital noise coming from a shielded wire pair connecting successive daisy chain connections 118 which are also in the same bundle in daisy chain cable 53. Both regulators 100 and 102 receive the same raw input voltage source of twenty-four volts supplied by site controller 50 over daisy chain cable 53.

Regulator 102 is a switch-mode type having a running frequency of eighty KHz. Response keypad 52 typically requires thirty-nine milliamps (mA) at five volts direct current (DC), and fifty-eight mA when relay 114 energizes to open the audio channel. The input voltage operating range of response keypad 52 is eight volts to twenty-four volts DC. Ripple on the five volt output of regulator 102 is fifty millivolts, with an input supply voltage of twelve volts, and seventy-five mV when the input supply voltage is greater than twelve volts. Regulator 102 is 64% to 77% efficient, depending on its input voltage. Table I summarizes various input voltages and currents for regulator 102.

TABLE I

| Input voltage | Current | Power |
| --- | --- | --- |
| 28 V | 9.0 mA | mW |
| 24 V | 9.9 mA | mW |
| 20 V | 11.1 mA | mW |
| 16 V | 13.1 mA | mW |
| 12 V | 16.4 mA | mW |
| 8 V | 23.8 mA | mW |

The number of response keypads 52 that can be attached to daisy chain cable 53 is constrained by the source voltage, the resistance of the wire used to interconnect them, and the operating voltage range limits of response keypad 52. The voltage available to each response keypad 52 drops as the distance a particular keypad 52 is away from site controller 50 increases. Assuming a source voltage of twenty-four volts provided by site controller 50, a single twenty-five foot cable with a resistance of 0.28 ohms, and a plurality of interconnecting eight foot long cables each with a resistance of 0.09 ohms for daisy chain cable 53, less than eight volts will be available at the end of cable 53 when there are about fifty keypads 52. Thus, the maximum number of response keypads 52 on a single daisy chain cable 53 is fifty. And further, the maximum number of response keypads 52 connected to a single site controller 50 using two separate daisy chain cables 53 is approximately one hundred. Preferably, actual users will be told to limit this number to sixty-four to round-off numbers and to provide some safety margin.

Response keypads 52 digitally communicate with site controller 50 through a single RS-485 channel. The RS-485 Electronic Industries Association (EIA) specification describes a high speed single duplex twisted pair, with each signal the complement of the other. Driver chip 96 may be a Linear Technology LTC485 made for this purpose. Although the LTC485 is specified by Linear Technology to be capable of driving only thirty-two nodes maximum, a network topology in which interconnecting links between response keypads 52 are kept to identical lengths has been tested extensively with sixty-four nodes, and found to be completely satisfactory. Driver chip 96 is, however, sensitive to over-voltages, and can be damaged if not protected. The Linear Technology LTC485 can only withstand a twenty volt DC level on one of its output pins. If a response keypad 52 is connected to the network with power already applied, driver 96 may inadvertently get shorted to the twenty-four volt source, which may destroy driver 96. Zener diodes 96 are sixteen volt types and have a seventy-five ohm resister in series with connection 118 to prevent the outputs of driver 96 from being damaged this way.

The audio channel in cable 53 connected to terminals 116 preferably uses a shielded twisted pair with a tap at each keypad 52 location. The twisted pair is electrically differential with a virtual ground of three VDC at the keypad it originated at, however, the voltage relative to site controller 50 is higher the farther away from site controller 50 the keypad is located. The virtual ground is set by the voltage divider formed by resistors 120 and 122. The audio circuits on each keypad are isolated from the common line by relays when a respective keypad 52 is told to turn on it's microphone. The command received over the RS-485 interface turns on relay 114 which routes the corresponding microphone output onto the common line in cable 53. The only significant design consideration regarding the audio channel is possibility of crosstalk from other sources (most notably the RS-485 communication line and the digital logic). Therefore, the wiring of the differential audio is such that it changes polarity at each terminal 116 in the daisy chain. This negates any crosstalk by ensuring that any energy added to the line is added evenly so it can be removed by the common mode rejection junction at site controller 50.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A response keypad unit, comprising:
   an electret microphone;
   an audio amplifier having an input connected to the microphone and having a differential output for low-noise operation;
   a daisy chain cable to distribute on a differential wire pair an audio channel, a digital serial input/output (SIO) channel and a power bus;
   switching means connected to the daisy chain cable and said differential output of the audio amplifier for selectively coupling the audio amplifier to the daisy chain; and
   microcomputer means connected to the daisy chain cable and including means for responding to a plurality of signals present on said SIO channel and including means for issuing a signal to the switching means to change its status.

2. A response keypad, comprising
   a microcomputer with a RAM for main memory and an EPROM for program memory;
   a membrane keypad connected to an input port of the microcomputer;
   a liquid crystal display adjacent to the keypad and connected to an output port of the microcomputer;
   a microphone and associated preamplifier;
   a differential output audio amplifier for receiving an amplified audio signal from the microphone;
   a relay means controlled by the microcomputer for switching the differential output audio amplifier on and off an audio channel in a daisy chain cable connected to other response keypads and a site controller;
   a differential serial input/output for interfacing the microcomputer to said daisy chain cable;
   a switching regulator to provide a first regulated voltage to the microcomputer; and
   a three-terminal linear regulator for supplying operating power to the microphone, associated preamplifier and differential output audio amplifier.

3. The response keypad of claim 2, wherein:
   wiring connections for said audio channel are cross connected to balance out digital noise that may be otherwise induced in the audio signal.

* * * * *